Patented June 12, 1934

1,962,827

UNITED STATES PATENT OFFICE 1,962,827

PROCESS FOR THE MANUFACTURE OF CELLULOSE DERIVATIVES CONTAINING PHOSPHORUS

Carl J. Malm, Rochester, N. Y., and Charles E. Waring, Dayton, Ohio, assignors to Eastman Kodak Company, Rochester, N. Y., a corporation of New York No Drawing. Application August 5, 1930, Serial No. 473,284

3 Claims. (Cl. 260—101)

This invention relates to a process for preparing inorganic derivatives of cellulose and particularly for the preparation of such esters as cellulose phosphate and cellulose phospho-acetate.

There have been many processes described in the literature for the preparation of cellulose phosphates, none of which, however, appear to have had a particular commercial success. For instance, in British Patent 8,646 of 1910 to Merckens, et al., there is described a process for making cellulose phospho-acetate by treating cellulose with acetic anhydride in the presence of sulphuric acid and a phosphorus oxychloride. At the most, there could be but a very small amount of phosphorus present in the resulting cellulose acetate as the phosphorus oxychloride used in this process is present in amounts only sufficient to act as a catalyst for the acetylation of the cellulose. British Patent 279,796 to I. G. Farbenindustrie A. G. of October 26, 1926, discloses a process for the preparation of cellulose phosphate in which soda cellulose is treated with phosphorus oxychloride and benzene for a period of about twelve hours. The product is stated to contain approximately 16% of $PO_4$ which is equivalent to about 5% of phosphorus. This product is asserted to be soluble in water. As the starting material is a soda cellulose prepared from 40% sodium hydroxide, it would be expected that the cellulose would be greatly broken down due to the drastic pretreatment and likewise to the activity of the phosphorus oxychloride. It is not surprising, therefore, that the final product is degraded to such a degree that it is water soluble.

Processes have been published for the treatment of cellulose in concentrated phosphoric acid solutions under various conditions and the subsequent precipitation of the resulting product which has been in some instances called a cellulose phosphate. Cellulose which has been dissolved in phosphoric acid and reprecipitated from this solution, however, does not, if carefully washed, contain any combined phosphorus. This method of attack, therefore, has not proven successful for the preparation of cellulose esters containing phosphorus. We have, however, perfected a process whereby said esters of cellulose may be readily and consistently prepared.

An object, therefore, of the present invention is to provide a process whereby compounds of cellulose containing phosphorus may be prepared. Another object of this invention is to provide a process for preparing derivatives of cellulose containing phosphorus, the products being substantially undegraded. A further object of this invention is to provide a process for the preparation of cellulose phospho-acetate. Other objects will hereinafter appear.

We have found that if cellulosic derivatives are treated with a mixture containing phosphorus pentoxide suspended in a suitable solvent for the cellulosic derivative, the solvent having no appreciable action on the suspended phosphorus pentoxide, a cellulose compound containing phosphorus may be obtained. Phosphorus containing derivatives prepared in this manner are insoluble in practically all organic solvents and resist burning to a very high degree.

Our process consists essentially in treating cellulose derivatives such as cellulose acetate, cellulose nitrate, cellulose ethers, etc., in an esterifying bath consisting of phosphorus pentoxide and a solvent for the cellulose derivative. For instance if cellulose acetate is to be treated, chloroform may be used as the solvent; if cellulose nitrate, -tricresyl phosphate; if cellulose ether, -chloroform, etc. It is merely necessary that this solvent does not react with the phosphorus pentoxide and likewise is a good solvent for the cellulose derivative.

The time for effecting the reaction is governed, of course, by the type of cellulose derivative being phosphated and likewise the temperature of the reaction. With a temperature in the proximity of 60–65° C. the maximum amount of phosphorus will generally be combined in about 18 to 24 hours.

We have found that when treating cellulose derivatives with our esterifying mixture, the reaction will proceed more smoothly if the cellulose acetate, for instance, be only partially esterified, the same is true for the cellulose ethers, although some phosphorus may be impelled into the cellulose, even though a fully esterified or etherified cellulose be treated. Whether the final product be a cellulose phospho-acetate, a cellulose phospho-ether, or cellulose phospho-nitrate, these compounds are all practically insoluble in the usual organic solvents, if sufficient phosphorus has been impelled into the cellulose.

It is not material what type of solvent be employed in the esterifying bath providing the phosphorus pentoxide does not react with it and furthermore, that this liquid be a solvent for the cellulose derivative in order that there be an intimate contact between the phosphorus pentoxide and the dissolved cellulose derivative. The following solvents have been found to be suitable for the phosphation of cellulose acetate, -tetrachloro-ethane, ethylene chloride; of cellulose nitrate, -chloroform, tricresyl phosphate and; of cellulose ethers, -chloroform, ethylene chloride.

We shall now give several examples for the preparation of cellulose compounds containing phosphorus, but it will be understood that we will not be limited by the details therein given except as they may be indicated by the appended claims.

*Example 1.*—125 grams of cellulose acetate containing about 38% acetyl may be dissolved in 1250 cc. of chloroform in a suitable vessel, preferably provided with a stirrer, at room temperature. 125 grams of phosphorus pentoxide may be added in small portions. The whole mass is then thoroughly mixed for a period of 15 minutes, when 500 cc. more of chloroform may be added. The viscosity of the resultant dope increases rapidly. After approximately 1½ hours, 1000 cc. more of chloroform may be added in order to prevent jelling, as at this period of the reaction the mixture will tend to have more and more of a jelly-like consistency. After mixing for a period of twenty hours, 700 cc. of methyl alcohol may be added to dilute the dope, and the final product may be precipitated in methyl alcohol and washed with hot water. Upon analysis the cellulose acetate will be found to contain in the order of 2% combined phosphorus.

*Example 2.*—A sample of cellulose ethyl ether may be dissolved in chloroform and treated with an excess of phosphorus pentoxide. After standing overnight at room temperature a solid jelly will be formed. This material may be ground up, washed with methyl alcohol to remove the chloroform and phosphorus pentoxide and then thoroughly washed. This product will be found to be soluble in cyclohexanone and tricresyl-phosphate. This solubility being evidently due to the fact that the compound contains but 1% of combined phosphorus.

*Example 3.*—10 grams of cellulose nitrate of 10.5% nitrogen content may be dissolved in 100 cc. of tri-cresyl-phosphate and 10 grams of phosphorus pentoxide added. Upon standing for a period of 10 hours at room temperature, the reaction mixture will jell. Upon grinding up the jelly and extracting with methyl alcohol in order to remove the phosphorus pentoxide and tricresyl-phosphate the product may be dried and upon analysis will be found to contain in the order of 2% combined phosphorus.

The unusual characteristic of our products, if sufficient phosphorus is combined therewith is that they are insoluble in practically all organic solvents usually employed for the solution of cellulose derivatives. They are, moreover, insoluble in water thus indicating that there has been slight if any degradation of the cellulose. The solubility of a cellulose compound in water generally indicates that the cellulose molecule has been broken down during its esterification.

Owing to the exceptionally high resistance to burning shown by our new cellulose derivatives there are many uses to which they are well adapted as for instance in high temperature valve or similar packing, fillers in various compositions of matter to reduce inflammability and numerous other uses.

While the above disclosure describes processes for the preparation of cellulose compounds containing phosphorus such as cellulose phospho-acetate, cellulose phospho-nitrate and cellulose phospho-ether, nevertheless, this invention likewise covers the formation of phosphorus containing equivalent organic or inorganic derivatives for cellulose or for that matter even of the mixed organic or mixed inorganic-organic derivatives of cellulose, if such be prepared by our process.

What we claim as our invention and desire to be secured by Letters Patent of the United States is:

1. A process for the preparation of a water insoluble phosphorus containing derivative of cellulose which comprises esterifying a partially hydrolyzed organic compound of cellulose in a bath the esterifying element of which consists principally of phosphorus pentoxide and a solvent for the organic compound of cellulose.

2. A process for the preparation of a water insoluble phosphorus containing cellulose ester which comprises esterifying a partially hydrolyzed cellulose acetate in a bath the esterifying element of which consists principally of phosphorus pentoxide and a solvent for the cellulose acetate.

3. A process for the preparation of a water insoluble phosphorus containing cellulose ester which comprises esterifying a cellulose acetate containing approximately 38 to 42 per cent acetyl in a bath the esterifying element of which consists principally of a phosphorus pentoxide and chloroform.

CARL J. MALM.
CHARLES E. WARING.